United States Patent [19]

Czarnikow

[11] 3,744,895
[45] July 10, 1973

[54] APPARATUS FOR FORMING IMAGES

[75] Inventor: George K. Czarnikow, Rochester, N.Y.

[73] Assignee: Eastman Kodak Company, Rochester, N.Y.

[22] Filed: Sept. 16, 1971

[21] Appl. No.: 181,260

Related U.S. Application Data

[63] Continuation of Ser. No. 874,768, Nov. 7, 1969, abandoned.

[52] U.S. Cl.......................... 355/3, 355/17, 355/107
[51] Int. Cl............................................. G03g 15/14
[58] Field of Search .................. 355/3, 71, 17, 107; 350/160 P

[56] References Cited
UNITED STATES PATENTS
3,256,791  6/1966  Blume.................................. 355/77

OTHER PUBLICATIONS

IBM Technical Disclosure Bulletin, Vol. 8, No. 2, July 1965, "Positive Display Screen for Film Negatives," by E. P. Damm, Jr., Page 278.

Primary Examiner—John M. Horan
Attorney—Robert W. Hampton

[57] ABSTRACT

A method and apparatus is provided for making positive electrostatic images on charged photoconductive material, such as zinc oxide, from negative originals without employing reverse development techniques. A layer of normally transparent photochromatic material is interposed between a negative original and the photoconductive material. The photochromatic material is exposed to the image by ultraviolet light to form a positive image thereon. This light is prevented from striking the photoconductive material by means of a shutter. Next, the shutter is opened and the photochromatic image is projected by white light, which does not pass through the negative original, onto the charged photoconductive material to form a positive electrostatic image. The original may comprise a film strip having negative image areas interspaced between transparent areas so that the filmstrip may be moved to initially position a negative image area for imagewise exposure of the photochromatic material to ultraviolet light and then moved to another position to expose the charged photoconductive material to the positive image on the photochromatic material by white light projected through a transparent area.

3 Claims, 2 Drawing Figures

PATENTED JUL 10 1973 3,744,895

GEORGE K. CZARNIKOW
INVENTOR.

BY Gary D. Fields
Robert W. Hampton
ATTORNEYS

APPARATUS FOR FORMING IMAGES

This application is a continuation of application Ser. No. 874,768 filed Nov. 7, 1969, now abandoned.

BACKGROUND OF THE INVENTION

1. Field of the Invention

This invention relates to making electrostatic images on photoconductive material and more particularly to making an electrostatic image which is the reverse of an original image by the use of photochromatic material.

2. Description of the Prior Art

In one conventional electrophotographic process a sheet of photoconductive material, such as zinc oxide is charged, as by a corona charger, to place a uniform electrostatic charge thereon. The sheet is then imagewise exposed to an original, the charge being dissipated in the light areas while remaining in the dark area. The electrostatic image thus toned is then developed by means of a suitable toner to form a permanent image. Thus, if the original image is a positive image a positive image will be formed on the photoconductive material, whereas if the original image is a negative image a negative image will be formed on the photoconductive material. However, in a wide range of applications it is desirable to make a positive copy from a negative original, such as negative microfilm. To accomplish this it is necessary, in accordance with the teachings of the prior art, to use reverse development techniques, i.e., to develop the discharge areas and leave the charged areas undeveloped by using a toner which has the same polarity as the charged areas. However, such techniques have a number of drawbacks. In the first place, a development electrode is usually necessary, adding to the cost and complexity of the apparatus. In addition, development by this method seldom produces copies which are as good as those made by direct development techniques. There is often some loss in resolution as well as some retension of toner in the charged areas, giving the final positive print a spotty, sometimes grayish appearance. In addition, the contrast usually is not as great as that obtained in a positive-to-positive system.

Photochromatic materials have been used for many applications. For instance, in U.S. Pat. No. 3,155,451 to Dunster et al. which issued Nov. 3, 1964, an apparatus is shown wherein a line trace is placed on a photochromatic belt by means of an ultraviolet radiation source which through appropriate means provides a trace in response to an input signal. This trace is utilized and then erased by high intensity lights so that the photochromatic belt may be reused. In U.S. Pat. No. 3,442,648 to Smith, which issued May 6, 1969, a layered structure for photographic dodging is shown wherein a photochromatic layer, coated onto a photographic negative is imagewise exposed to the negative by ultraviolet light for a short period of time to form a faint positive image. The layered structure is then exposed to white light to imagewise expose photographic paper to the composite negative image and positive image exposure to soften shadows in a print formed on the photographic paper.

SUMMARY OF THE INVENTION

An electrostatic image can be made on photoconductive material from an original which is the reverse of the original by interposing between the two a layer of normally transparent photosensitive material. This material may be of the type which becomes darkened upon exposure to a first range of electromagnetic radiation at a first energy level and becomes transparent again upon exposure to a second range of electromagnetic radiation at a second energy level which is higher than said first energy level. Initially, the photosensitive material is exposed to the original by the first range of electromagnetic radiation at the first energy level to form a reverse image thereon. Subsequently, the charged photoconductive material is exposed to the image on the photosensitive material by means of the second range of electromagnetic radiation at an energy level less than the second energy level to form an electrostatic image on said photoconductive material corresponding to the image on said photosensitive material by dissipating the electrostatic charge in exposed areas. More specifically, a positive electrostatic image can be made from a negative original. In one form, microfilm can be provided having negative image areas alternating with transparent areas. When a negative original image is in an exposure station, a layer of photochromatic material thereunder can be exposed by ultraviolet light passing through the negative image area. This exposure causes the normally transparent photochromatic material to quickly darken in the exposed areas to form a positive image. The ultraviolet light source may be provided either by a separate ultraviolet light or by a white light source which includes ultraviolet light and a suitable filter to permit passage only of ultraviolet rays. During this exposure, a shutter interposed between the photochromatic material and the charged photoconductive material is closed so that the charge on the photoconductive material will not be dissipated.

After formation of a positive image on the photochromatic material, the filmstrip is advanced so that a transparent area is in the projection station and the shutter is opened allowing the photoconductive material to be exposed to the positive image on the photochromatic material. The charge is dissipated in areas struck by the light but remains in the dark areas to form a positive electrostatic image. The length of exposure, however, is not at a sufficient energy level to remove the image on the photochromatic material. This positive electrostatic image then can be developed and fixed to the photoconductive material or transferred to a suitable receiver sheet. Thus, a positive print may be made on photoconductive material, such as zinc oxide, from a negative original, such as negative microfilm. Advantageously, this image can be developed by direct development techniques which give high resoltuion and contrast. If desired, a control means may be provided to accomplish the sequence of operations described.

Of course, it will be understood, that by removing the photochromatic material, a positive electrostatic image can be made directly from a positive original.

Additional advantages of this invention will become apparent from the description which follows.

DESCRIPTION OF THE PREFERRED EMBODIMENT

Figure 1:
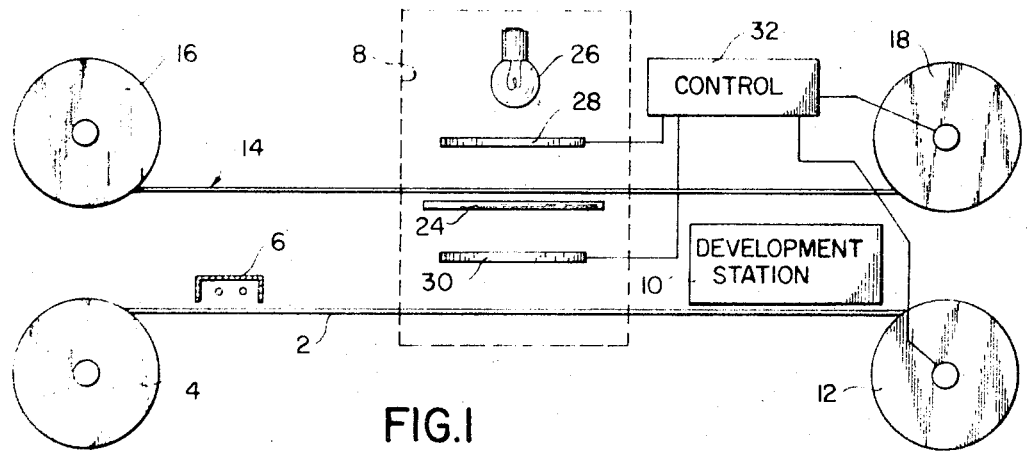
FIG. 1 is a diagrammatic side elevation of one form of apparatus constructed in accordance with this invention.

In accordance with this invention, a sheet of photoconductive material 2 may be fed as a web from a supply roll 4 past a charging station, indicated as a corona charger 6, to place a uniform electrostatic charge thereon. The sheet 2 may then be fed into an exposure station 8, indicated in FIG. 1 in dotted lines, to be imagewise exposed to form an electrostatic charge image thereon. After exposure the electrostatic image may be developed at the developing station 10 and subsequently transferred to a receiver sheet, not shown, or if the photoconductive material itself is to be the receiver it may be cut into individual sheet or it may be wound onto a storage roll 12.

It will be understood that photoconductive material 2 may be any suitable material which will retain an electrostatic charge and may be of the type which is intended for reuse after transfer of an electrostatic image or a toner image to a suitable receiver. On the other hand the photoconductive material itself may serve as a receiver, such as commercially available zinc oxide coated paper. In addition, the photoconductive material may be provided in cut sheets rather than a continuous web as illustrated. Likewise, the original to be copied may be provided in cut sheets or strips or any desirable form.

Figure 2:
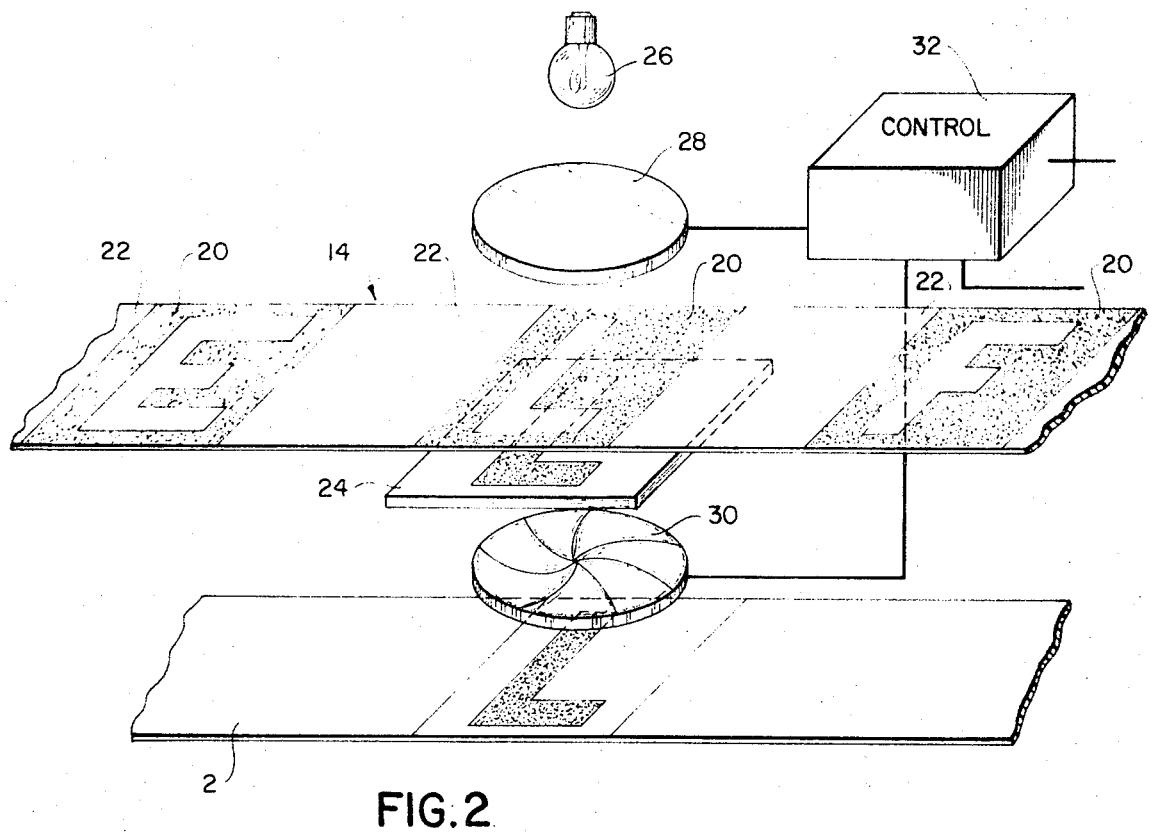
FIG. 2 is a perspective view of the apparatus of FIG. 1 showing further details thereof.

For purposes of illustration, filmstrip 14 is illustrated which is fed from a supply roll 16 through exposure station 8 to a take-up roll 18. Conveniently, as best seen in FIG. 2, film strip 14 is provided with alternating negative image areas 20 and transparent areas 22. The formation of a positive electrostatic image on photoconductive layer 2 is accomplished in the following manner. First a negative image 20 on filmstrip 14 is positioned within exposure station 8 so that a photochromatic layer 24 located between filmstrip 14 and photoconductive material 2 can be imagewise exposed to ultraviolet light. Ultraviolet light may be a separate ultraviolet light source or, as illustrated, white light source 26 which also includes the ultraviolet range of the electromagnetic spectrum. In this case an ultraviolet filter 28 can be interposed between light source 26 and filmstrip 14 to permit only the ultraviolet light to pass through the filmstrip. This will cause darkening of the normally transparent photochromatic layer 24 in the exposed areas to form a positive transparency image. During this exposure, a shutter 30 provided between photochromatic layer 24 and photoconductive layer 2 is closed, as shown in FIG. 2, to prevent any ultraviolet radiation from striking the charged surface of the photoconductive layer to avoid discharging thereof.

Next, filmstrip 14 is advanced so that a transparent area 22 is positioned in the exposure station, during which time photoconductive material 2 is imagewise exposed by white light source 26 to the positive image on photochromatic layer 24. During this exposure filter 28 is removed, by means not shown, and shutter 30 is opened to permit exposure of photoconductive layer 2. The electrostatic charge on photoconductive sheet 2 is dissipated in the exposed areas but remains in the dark, unexposed areas to form a positive electrostatic image. It will be understood that the energy level of exposure to white light is not sufficient to return photochromatic material 24 to its transparent state during the expsoure period of the photoconductive material. Subsequent to the formation of an electrostatic positive image on photoconducive layer 2, the photoconductive layer is advanced past development station 10 where the image is developed by a toner having a charge opposite to that of the electrostatic image. After development this image could be transferred to a receiver, not shown, or it may be permanently affixed to the photoconductive material 2 and wound on storage roll 12 or cut into individual sheets for use. If desired, a suitable control circuit 32 can be provided which controls each one of these operations in timed sequence in a manner understood to one skilled in the art.

Of course, after the imagewise exposure of photoconductive layer 2, photochromatic material 24 can be exposed to white light 26 for a substantially longer period to time or to a more tense light to return the photochromatic material to its original transparent condition for subsequent exposure to ultraviolt light to form a subsequent image.

From the foregoing, it can be seen that a simple method and apparatus have been provided whereby a positive electrostatic image can be formed on a photoconductive material from a negative original without employing reverse development techniques.

The invention has been described in detail with particular reference to a preferred embodiment thereof, but it will be understood that variations and modifications can be effected within the spirit and scope of the invention.

I claim:

1. An apparatus for forming an electrostatic image on a charged photoconductive member, which image is the reverse of an original, said apparatus comprising:

an exposure station including a projection station and a recording station spaced from said projection station;

means for intermittently feeding an image bearing medium having image areas into said exposure station to position a selected image area at said projection station;

means for moving the charged photoconductive member into said exposure station to a position in said recording station;

a photochromatic element disposed in said exposure station between said projection and recording stations;

means for projecting ultraviolet light through the selected image area of the image bearing medium to form a projectable, reverse image in said photochromatic element;

means for blocking ultraviolet light from striking the charged photoconductive member located at the exposure station;

means for displacing the selected negative image out of said exposure station;

means for projecting white light through said reverse image on said photochromatic element to form a corresponding electrostatic image on the photoconductive member located at the recording station; and control means for selectively energizing said feeding means, said moving means, said displacing means, said ultraviolet light projecting means, said white light projecting means and said blocking means for exposing said photochromatic means to an ultraviolet radiation pattern to form said reverse image when a selected image area is in said exposure station without exposing said charged photoconductive member and to expose the charged photoconductive sheet at said recording station to a white light pattern by white light projected through said reverse image on said photochromatic element to form the corresponding electrostatic image on said photoconductive member.

2. In electrophotographic apparatus of the type having an electrophotosensitive element movable along an operative path past an electrostatic charging station, an exposure station and a development station, an improved exposure station comprising:

means for supporting an original in a copy region;

photosensitive means for forming a reverse image of said original in response to an exposure to said original by means of a first range of electromagnetic radiation, said photosensitive means being constructed so that a reverse image formed therein can be projected by a second range of electromagnetic radiation which may include said first range of electromagnetic radiation;

means for exposing said photosensitive means to an original support by said support means by said first range of electromagnetic radiation to form a projectable reverse image thereof in said photosensitive means;

means for projecting the reverse image formed in said photosensitive means onto said electrophotosensitive element by means of a second range of electromagnetic radiation;

shutter means located between said photosensitive means and said electrophotosensitive means; and first control means for maintaining said shutter means in a light blocking condition during operation of said radiation exposing means and for opening said shutter means during operation of said radiation projection means.

3. The invention defined in claim 2 further including means for selectively moving an original out of said copy region and second control means, cooperable with said first control means, for operating said moving means to move such original out of said copy region prior to operation of said second radiation projection means and opening of said shutter means.

* * * * *